(12) United States Patent  
Rados et al.

(10) Patent No.: US 8,958,336 B2  
(45) Date of Patent: Feb. 17, 2015

(54) CONDITION DETECTION BY A CALL SESSION CONTROL FUNCTION (CSCF)

(75) Inventors: Steven R. Rados, Danville, CA (US); Priscilla Lau, Fremont, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 830 days.

(21) Appl. No.: 13/049,338

(22) Filed: Mar. 16, 2011

(65) Prior Publication Data

US 2012/0236753 A1     Sep. 20, 2012

(51) Int. Cl.
*H04L 12/26* (2006.01)
*H04L 29/06* (2006.01)

(52) U.S. Cl.
CPC ........ *H04L 65/1016* (2013.01); *H04L 65/1046* (2013.01); *H04L 65/1069* (2013.01); *H04L 65/80* (2013.01)
USPC .......................................................... 370/253

(58) Field of Classification Search
CPC ............ H04L 65/1016; H04L 65/1046; H04L 65/1069; H04L 65/80
USPC .......................................................... 370/253
See application file for complete search history.

(56) References Cited

U.S. PATENT DOCUMENTS

| | | | |
|---|---|---|---|
| 2011/0022641 A1* | 1/2011 | Werth et al. ................... | 707/803 |
| 2012/0287844 A1* | 11/2012 | Ophir et al. .................... | 370/315 |
| 2013/0041932 A1* | 2/2013 | Moore et al. ................... | 709/203 |
| 2013/0051233 A1* | 2/2013 | Yang et al. ..................... | 370/235 |

OTHER PUBLICATIONS

Tirana et al., Congestion Avoidance in S-CSCF Selection in an IMS Network, Sep. 2010, Proc. of 22nd International Teletraffic Congress (ITC22), pp. 1-8.*

Wikipedia, Denial-of-service attach, Mar. 4, 2011 retrieved from internet archive, pp. 1-13.*

* cited by examiner

*Primary Examiner* — Jung Park
*Assistant Examiner* — Albert Shih (57) ABSTRACT

A system configured to receive, from a user device, traffic associated with a request to initiate a call session; detect a condition associated with the traffic; determine whether to establish the call session based on whether the condition, associated with the traffic, is a particular type of condition; send, to a server device, a notification to perform an operation to remedy the condition when the condition does not correspond to the particular type of condition, where sending the notification enables the server device to identify a type of condition, identify an operation that remedies the condition based on the type of condition, or initiate the operation to remedy the condition; and establish the call session when the type of condition corresponds to the particular type of condition, where establishing the call session enables a call, placed by the user device, to be processed as a normal call.

25 Claims, 6 Drawing Sheets

| CONDITION ID 410 | CONDITION RESPONSE 420 |
|---|---|
| CONDITION A | RESPONSE A |
| CONDITION B | RESPONSE B |
| CONDITION C | RESPONSE C |
| CONDITION D | RESPONSE D |
| ... | ... |

| SOURCE USER DEVICE ID 505 | SOURCE eNB ID 510 | SESSION ID 515 | SGW ID 520 | DESTINATION USER DEVICE ID 525 | PGW ID 530 | CONDITION ID 535 | CONDITION RESPONSE 540 |
|---|---|---|---|---|---|---|---|
| MDNS1 | E1 | 001 | S1 | MDND1 | P1 | CONDITION A | RESPONSE A |
| MDNS2 | E1 | 002 | - | MDND2 | - | CONDITION B | RESPONSE B |
| MDNS3 | E1 | 003 | S1 | MDND3 | P3 | CONDITION C | RESPONSE C |
| MDNS4 | E1 | 004 | S2 | LDND4 | P4 | CONDITION D | RESPONSE D |

FIG. 6 data rate (e.g., greater than a threshold), an unexpected message type, a mis-ordered packet, an out-of-order signal and/or message, an incorrect message protocol, etc., are detected within the traffic. An unexpected message type may include a message and/or signal associated with a protocol that is different than a protocol being used to communicate with user device. An out-of-order signal may include a message and/or signal, associated with a protocol that is being used to communicate with the user device, that is received out-of-order. The CSCF may also identify a condition when nefarious information and/or malicious software (e.g., a virus, a worm, spy ware, etc.), and/or an electronic attack (e.g., spoofing, a denial of service attack, etc.) are identified within the traffic.

CONDITION DETECTION BY A CALL SESSION CONTROL FUNCTION (CSCF)

BACKGROUND

Evolved Packet System (EPS) is a core network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session. The EPS may communicate with an Internet protocol (IP) multimedia subsystem (IMS) core. The IMS core may include may manage authentication, session initiation, account information, profile information, etc. associated with the user device.

The IMS core may initiate and/or establish a call with a user device that enables a call to be transported to and/or placed from the user device via the EPS. Unfortunately, because the IMS core initiates and/or establishes the call session directly with the user device, devices within the IMS core (e.g., a call session control function (CSCF) device, etc.) may be particularly vulnerable to harmful traffic (e.g., incorrect protocols, signaling, etc.), nefarious information (e.g., malicious software, such as viruses, worms, spy ware, etc.), and/or electronic attack (e.g., spoofing, denial of service attacks, etc.) being transmitted by the user device.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a call session control function (CSCF) server to detect a condition, associated with traffic being sent to and/or received from a user device. The CSCF server may, based on a level of severity of the condition (e.g., low, moderate, maximum, etc.), process the traffic as normal traffic, terminate communications with the user device, and/or cause the condition to be dynamically mitigated and/or remedied by another device (e.g., an off-board device).

As described herein, the CSCF may identify a condition when protocol and/or signaling errors, such as an excessive As also described herein, the CSCF server may detect a condition associated with the communication to initiate and/or establish a call session. The CSCF server may identify a type and/or severity of the condition that was detected. As described herein, a minor condition may be associated with a level of severity that is less than a threshold. The minor condition may generally not affect a level of performance associated with the CSCF server. As also described herein, a moderate condition may correspond to a level of severity that is greater than the threshold and less than another threshold associated with a major condition. The moderate condition may generally degrade the level of performance of the CSCF server. As further described herein, a major condition may correspond to a level of severity that is greater than the other threshold. The major condition may generally degrade the performance level of the CSCF server and/or may damage the CSCF server if the major condition is not remedied.

The CSCF server may process the call in a number of ways based on the identified type and/or severity of the condition. In one example, the CSCF server may determine that the condition is a particular type of condition (e.g., a minor condition). The CSCF server may, for example, establish a call session and/or process a call, as a normal call, based on the determination that the condition is the particular type of condition. When processing the call, as the normal call, the CSCF server may, for example, enable the call session to be established and/or may permit the call to be forwarded to a destination user device. The CSCF server may, in another example, send a notification to the user device and/or another device that indicates that the condition has been detected.

In another example, the CSCF server may determine that the type of condition is not the particular type of condition and may notify an off-board device (e.g., an analytics server) that a condition other than the particular type of condition has been detected. The off-board device may, in response to the notification, identify that the condition is a moderate condition and may cause an operation to be performed that dynamically mitigates and/or remedies the condition. The CSCF server may establish the communication session and/or forward the call to a destination user device based on the condition being remedied or mitigated.

In another example, the off-board device may, in response to the notification, identify that the condition is a major condition. The off-board device may send another notification to the CSCF server that indicates that the condition is the major condition. The off-board device may cause an operation to be performed that dynamically mitigates and/or remedies the major condition. The CSCF server may receive the other notification and may establish the communication session when the other notification indicates that the condition has been remedied. The CSCF server may, in another example, terminate the call session and/or communications with the user device when the other notification indicates that the condition cannot be remedied and/or that the condition is associated with nefarious information and/or a potential electronic attack.

When the CSCF server detects a condition, the CSCF server may cause the condition to be processed in a manner that avoids, mitigates, and/or repairs damage caused by the condition and/or minimizes a reduction in CSCF server performance. Additionally, or alternatively, when the CSCF server terminates a call or causes a condition to be dynamically mitigated and/or remedied by an off-board device, the processing capacity of the CSCF server may be used to continue to process calls without a reduction in call throughput and/or experiencing a service disruption.

The description below describes the systems and/or methods in a context associated with of a call session with a user device for explanatory purposes. In other implementations, the systems and/or methods may be implemented in another context associated with a communication session that corresponds to a type of communication with a user device other than or in addition to calls (e.g., a communication associated with short message service (SMS), multi-media message service (MMS), data, video, etc.).

Figure 1:
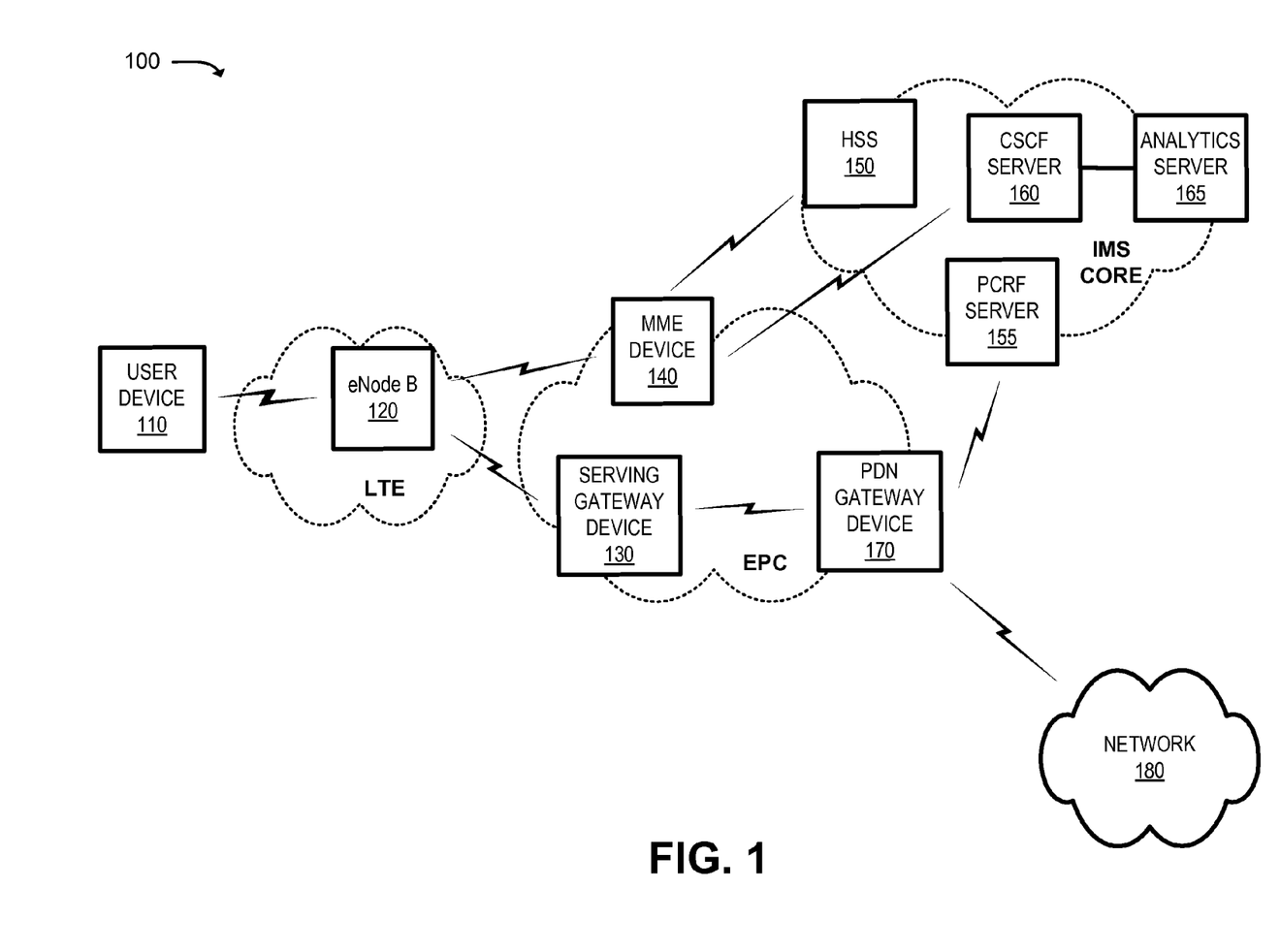
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, an e-Node B 120 (hereinafter referred to as an "eNB 120"), a serving gateway device 130 (hereinafter referred to as a "SGW 130"), a mobility management entity device 140 (hereinafter referred to as "MME 140"), a home subscriber server 150 (hereinafter referred to as a "HSS 150"), a policy and charging resource function (PCRF) server 155, a call session control function (CSCF) server 160 (hereinafter referred to as a "CSCF server 160"), an analytics server 165, a packet data network (PDN) gateway device 170 (hereinafter referred to as a "PGW 170"), and a network 180. The number of devices and/or networks, illustrated in FIG. 1, is provided for explanatory purposes only. In practice, there may be additional devices and/or networks; fewer devices and/or networks; different devices networks; or differently arranged devices and/or networks than illustrated in FIG. 1.

Also, in some implementations, one or more of the devices of environment 100 may perform one or more functions described as being performed by another one or more of the devices of environment 100. Further, PCRF 155, CSCF server 160, and/or analytics server 165 may be integrated into a single device. Devices of environment 100 may interconnect via wired connections, wireless connections, or a combination of wired and wireless connections.

Environment 100 may correspond to an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more eNBs 120 via which user device 110 communicates with the EPC and/or other user devices 110. The EPC may include SGW 130, MME 140, and/or PGW 170 that enables user device 110 to communicate with network 180, other user devices 110, and/ or an Internet protocol (IP) multimedia subsystem (IMS) core. The IMS core may include HSS 150, CSCF server 160, and/or analytics server 165, and may manage authentication, security and/or protection protocols, session initiation protocols, account information, network policy enforcement, profile information, etc. associated with user device 110.

User device 110 may include any computation or communication device, such as a wireless mobile communication device that is capable of communicating with eNB 120 and/or a network (e.g., network 180). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, laptop computer, a tablet computer, a camera, a personal gaming system, or another type of mobile computation or communication device. In one example, user device 110 may send traffic to and/or receive traffic from the EPS. In another example, user device 110 may place calls to other user devices 110 and/or receive calls from other user devices 110 via the EPS.

eNB 120 may include one or more devices that receive, process, and/or transmit traffic, such as voice, video, text, and/or other data, destined for and/or received from user device 110. One or more eNBs 120 may be associated with the LTE network that receives traffic from and/or sends traffic to network 180 and/or the IMS core via the EPC. eNB 120 may send traffic to and/or receive traffic from user device 110 via an air interface (via an LTE-Uu interface).

eNB 120 may receive a notification from PCRF server 150 that indicates that the data rate and/or bandwidth, associated with a call to and/or from user device 110, is to be reduced and eNB 120 may reduce the data rate and/or bandwidth in response to the notification. eNB 120 may receive another notification from PCRF server 150 that indicates that the call is to be ended and/or a call session, associated with user device 110, is to be terminated. eNB 120 may end the call and/or terminate the call session in response to the other notification.

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNBs 120 and may send the aggregated traffic to network 180 (e.g., via PGW 170) and/or other devices associated with the IMS core and/or the EPC. SGW 130 may also receive traffic from the other network devices and/or may send the received traffic to user device 110 via eNB 120. For example, SGW 130 may receive an instruction (e.g., as a result of a registration operation, handoff operation, and/or some other operation) from MME 140 to establish a connection (e.g., a tunnel) that permits user device 110 to communicate with other user devices 110 and/or network devices associated with the LTE, EPC, the IMS core, and/or network 180.

SGW 130 may receive a notification from PCRF server 150 that indicates that the data rate and/or bandwidth, associated with a call to and/or from user device 110, is to be reduced and SGW 130 may reduce the data rate and/or bandwidth in response to the notification. SGW 130 may receive another notification from PCRF server 150 that indicates that the call is to be ended and/or a call session, associated with user device 110, is to be terminated. SGW 130 may end the call and/or terminate the call session in response to the other notification.

MME 140 may include one or more devices, or other types of computation or communication devices, that gather, process, search, store, and/or provide information in a manner described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations on traffic destined for and/or received from user device 110.

HSS 150 may include one or more server devices, or other types of computation or communication devices, that gather, process, search, store, and/or provide information in a manner described herein. For example, HSS 150 may manage, update, and/or store, in a memory associated with HSS 150, service profile information associated with user device 110. The service profile information may include access point names (APNs) that are permitted for and/or accessible by user device 110; information associated with a user of user device 110 (e.g., a username, a password, a personal identification number (PIN), etc.); rate information; minutes allowed; and/or other information. Additionally, or alternatively, HSS 150 may include a device that performs authentication, authorization, and/or accounting (AAA) operations associated with a call session with user device 110. HSS 150 may receive, from MME device 140, an indication that user device 110 is attempting to establish a call session with the EPC and may identify via which CSCF server 160 the session is to be initiated.

PCRF server 155 may include one or more server devices, or other types of computation or communication devices, that gather, process, search, store, and/or provide information in a manner described herein. In one example implementation, PCRF server 155 may perform operations to provide EPS policies associated with a call session with user device 110. For example, the PCRF server 155 may dynamically provide real-time bandwidth allocations and/or controls (e.g., associated with a particular APN) associated with particular applications, network accesses, and/or services provided to user device 110 during a communication and/or call session. In another example, the PCRF may dynamically provide a real-time signal flow policy to adapt to changing conditions within the network and/or to manage traffic flow during the call session. PCRF server 155 may provide a quality of service (QoS) policy associated with the call session.

PCRF server 155 may receive instructions from CSCF server 160 and/or analytics server 165 associated with an operation to mitigate condition associated with a call. For example PCRF server 155 may receive, from analytics server 165, a notification to modulate bandwidth and/or data rate associated with a call to which a condition corresponds (e.g., a condition of moderate severity). PCRF server 155 may, in response to the notification, send an instruction, to one or more call bearers via which the call is being handled (e.g., eNB 120, SGW 130, PGW 170, etc.), indicating that the bandwidth and/or data rate, associated with the call, is to be reduced to a particular level that is specified in the notification. In another example PCRF server 155 may receive, from analytics server 165 and/or CSCF 160, a notification that a call, with which a condition (e.g., a condition of maximum severity) is associated, is to be terminated. PCRF server 155 may, in response to the notification, send an instruction to one or more call bearers (e.g., eNB 120, SGW 130, PGW 170, etc.) indicating that the call is to be terminated.

CSCF server 160 may include one or more server devices, or other types of computation or communication devices, that gather, process, search, store, and/or provide information in a manner described herein. In one example implementation, CSCF server 160 may execute a session initiation protocol (SIP) associated with establishing a call session with user device 110. In an example implementation, CSCF server 160 may be a serving-CSCF server. CSCF server 160 may communicate via network 180 and may process and/or route calls to and/or from user device 110. CSCF server 160 may, for example, route a call received from user device 110 (e.g., via eNB 120) and may route the call to a destination device and/or perform operations associated with monitoring minutes and/or billing information associated with the call.

CSCF server 160 may receive a query from SGW 130 to identify via which eNB 120 and/or other SGW 130 a call is to be routed to a destination user device 110. CSCF server 160 may use information associated with the destination user device 110 on which to base the determination (e.g., from a look up table) via which eNB 120 and/or other SGW 130 the call is to be routed. Based on the determination, CSCF server 160 may send information, associated with the identified eNB 120 and/or the other SGW 130, to SGW 130.

CSCF server 160 may perform a network protection operation that detects a condition associated with traffic received from user device 110. For example, CSCF server 160 may communicate with user device 110 to establish a call session and may detect a condition associated with traffic received from user device 110. In one example, CSCF server 160 may identify a condition when protocol and/or signaling errors, such as an unexpected message type, a mis-ordered packet, out-of-order signaling, an incorrect protocol, etc., are detected within the traffic. In another example, CSCF server 160 may detect a condition when a bandwidth and/or data rate, associated with the traffic, is greater than a threshold. In yet another example, CSCF server 160 may identify a condition when nefarious information and/or malicious software (e.g., a virus, a worm, spy ware, etc.), and/or an electronic attack (e.g., spoofing, a denial of service attack, etc.) are identified within the traffic.

CSCF server 160 may determine whether a condition, associated with a call, is a particular type of condition (e.g., a minor condition) that corresponds to a low level of severity relative to a threshold. For example, CSCF server 160 may detect a data rate, a quantity of mis-ordered packets, a quantity of mis-ordered signals, a quantity of unexpected message types, etc. CSCF server 160 may determine that a data rate, one or more of the quantity of mis-ordered packets, the quantity of mis-ordered signals, the quantity of unexpected message types, etc. are not greater than a respective threshold. Based on the determination that one or more of the quantity of mis-ordered packets, the quantity of mis-ordered signals, the quantity of unexpected message types, etc. are not greater than the respective threshold, CSCF server 160 may process the call as a normal call and may send a notification to user device 110 and/or PCRF server 155 indicating that the minor condition, has been detected with respect to the call. The notification may indicate, for example, that software is to be updated on user device 110. CSCF server 160 may, in another example, based on the detection of the minor condition, ignore the condition and/or process the call as a normal call.

In another example, CSCF server 160 may determine that one or more of a data rate, the quantity of mis-ordered packets, the quantity of mis-ordered signals, the quantity of unexpected message types, etc. is greater than the respective threshold. Based on the determination that one or more of the quantity of mis-ordered packets, the quantity of mis-ordered signals, the quantity of unexpected message types, etc. is greater than the respective threshold, CSCF server 160 may determine that the condition is not the minor condition (e.g., the condition is not associated with a low level of severity). In this example, CSCF server 160 may not process the call as a normal call and may send a notification to analytics server 165 that indicates that a condition has been detected with respect to the call. In yet another example, if CSCF server 160 detects potentially malicious software and/or a potential electronic attack associated with the call, CSCF server 160 may terminate the call with user device 110. When terminating the call, CSCF server 160 may send a notification to PCRF server 155 and/or analytics server 165 indicating that the call is to be terminated.

CSCF server 160 may store information associated with the condition in a condition log. The information associated with the condition may include a time at which the condition was detected, information associated with a type and/or level of severity of the condition, information associated with a call to which the condition is associated (e.g., information associated with a source user device 110, destination user device 110, an identifier associated with the call session, etc.), information associated with signal bearers (e.g., identifiers associated with eNB 120, SGW 130, PGW 170, etc.).

Analytics server 165 may include one or more server devices, or other types of computation or communication devices, that gather, process, search, store, and/or provide information in a manner described herein. In one example implementation, analytics server 165 may perform an operation to repair a condition, to contain a condition, and/or to terminate a call to which a condition corresponds in response to instructions received from CSCF server 160.

Analytics server 165 may receive a notification from CSCF server 160 that indicates that a condition, associated with a call, has been detected. In one example, the notification may identify a type of condition (e.g., a moderate or major condition) associated with the call and analytics server 160 may use the identified type of condition to determine the manner in which to respond to the condition.

In another example, analytics server 165 may analyze packets, associated with the call to which the condition corresponds to identify the type of condition. Analytics server 165 may, for example, analyze the packets associated with the call to identify offending packets and/or messages, perform forensics on the packets, and/or to obtain information associated with the condition and/or another condition associated with the call. Analytics server 165 may, for example, determine that the condition is a moderate condition (e.g., associated with a moderate severity level) when one or more of the quantity of mis-ordered packets, the quantity of mis-ordered signals, the quantity of unexpected message types, etc. is not greater than a threshold associated with a maximum severity level.

Analytical server 165 may, in another example, determine that the condition is a major condition (e.g., associated with a maximum severity level) when one or more of the quantity of mis-ordered packets, the quantity of mis-ordered signals, the quantity of unexpected message types, etc. is greater than a threshold associated with a maximum severity level. Analytical server 165 may, in yet another example, determine that the condition is a major condition when analytical server 165 detects malicious software and/or a potential electronic attack associated with the call.

Analytics server 165 may determine the manner in which to respond to the condition based on the type of condition. Analytics server 165 may perform a look up operation by accessing a condition and/or response (CR) data structure (e.g., stored in a memory associated with analytics server 165). When accessing the CR data structure, analytics server 165 may identify a particular response that corresponds to the type of condition associated with the traffic.

For example, analytics server 165 may, as a result of the look up operation (e.g., associated with a moderate condition), identify that a repair operation is to be performed to reduce a data rate and/or bandwidth associated with the call associated with the condition. When performing the repair operation, analytics server 165 may, for example, cause updated software to be sent to user device 110 to correct signaling and/or protocol errors. Analytics server 165 may send a notification to PCRF server 155 that indicates that the repair operation is to be performed. The notification may indicate that the data rate and/or bandwidth is to be reduced to a level that is below a threshold and/or that the updated software is to be sent to user device 110.

In another example, analytics server 165 may, as a result of the look up operation (e.g., associated with a moderate and/or major condition), identify that a containment operation is to be performed to reduce a data rate and/or bandwidth associated with the call. When performing the containment operation, analytics server 165 may, for example, cause a forwarding priority and/or a QoS, associated with the call, to be downgraded. Analytics server 165 may send a notification to PCRF server 155 and/or HSS server 150 that indicates that the containment operation is to be performed. The notification may indicate that the data rate and/or bandwidth is to be reduced to the level that is below the threshold and/or may identify the QoS and/or forwarding priority for the call.

In yet another example, analytics server 165 may, as a result of the look up operation (e.g., based on a major condition), identify that a termination operation is to be performed that ends the call and/or terminates a call session with user device 110. Analytics server 165 may perform the termination operation by sending a notification to CSCF server 160 and/or PCRF server 155 that indicates that the call is to be ended and/or the call session terminated. In another example, analytics server 165 may send a notification to HSS 150 indicating that services and/or access to the EPS, by user device 110, are to be restricted or unauthorized based on the termination operation.

PGW 170 may include one or more devices, or other types of computation or communication devices, that gather, process, search, store, and/or provide information in a manner similar to that described herein. PGW 170 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 170 may include a device that aggregates traffic received from one or more SGWs 130 and may send the aggregated traffic to network 180 and/or the IMS core (e.g., PCRF server 155, CSCF server 160, etc.). In another example implementation, PGW 170 may receive traffic from network 180 and may send the traffic to user device 110 via SGW 130 and/or eNB 120. PGW 170 may perform policing operations on traffic destined for the EPS.

PGW 170 may receive a notification from PCRF server 150 that indicates that the data rate and/or bandwidth, associated with a call to and/or from user device 110, is to be reduced and PGW 170 may reduce the data rate and/or bandwidth in response to the notification. PGW 170 may receive another notification from PCRF server 150 that indicates that the call is to be ended and/or a call session, associated with user device 110, is to be terminated. PGW 170 may end the call and/or terminate the call session in response to the other notification.

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Network 180 may transport traffic to and/or from the EPS (e.g., via PGW 170) and/or another network.

Figure 2:
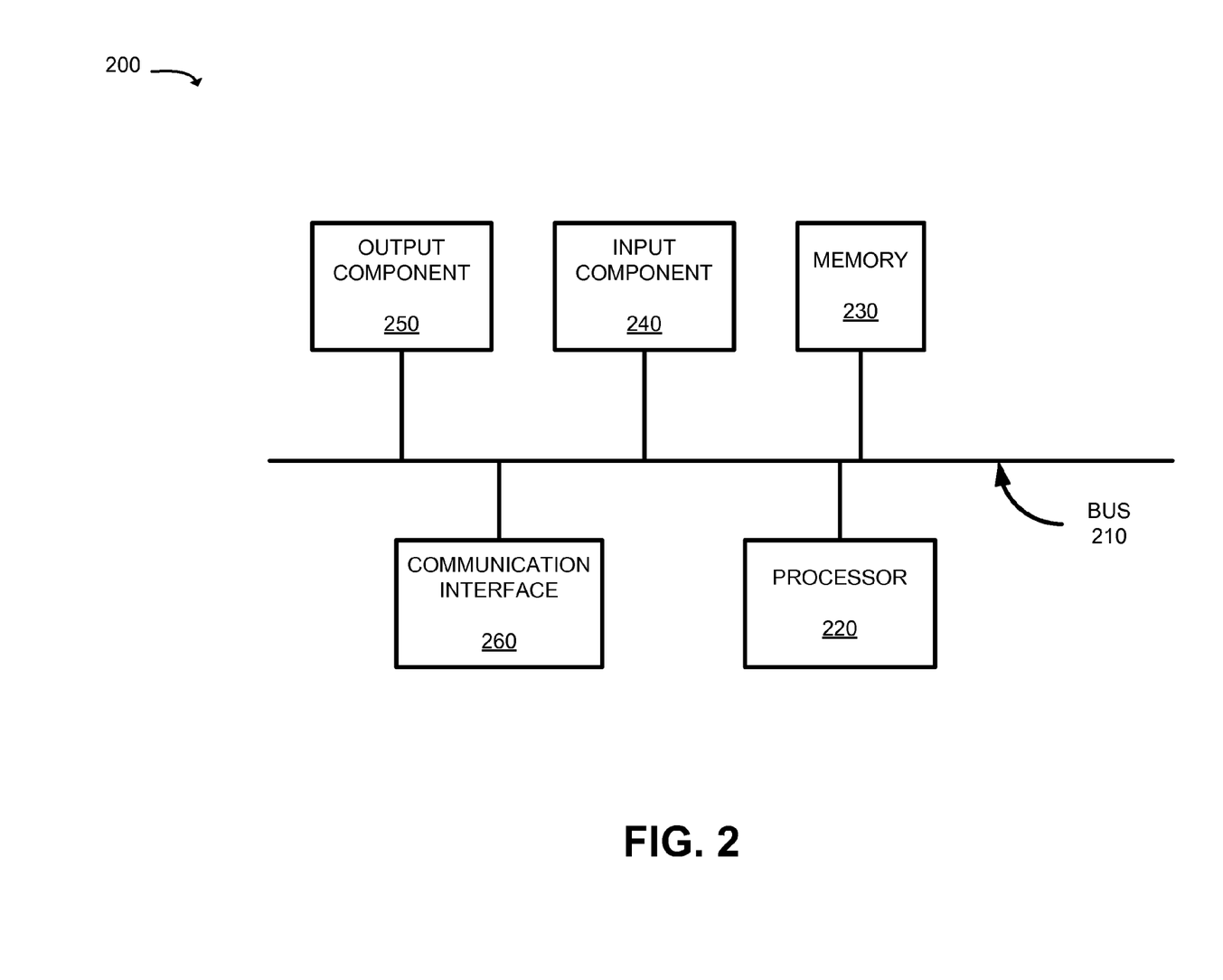
FIG. 2 is a diagram of example components of one or more devices of FIG. 1.

FIG. 2 is a diagram of example components of a device 200. Device 200 may correspond to user device 110, MME 140, HSS 150, CSCF server 160, and/or analytics server 165. Alternatively, or additionally, each of user device 110, MME 140, HSS 150, CSCF server 160 and/or analytics server 165 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 180. In one alternative implementation, communication interface 260 may be a logical component that includes input and output ports, input and output systems, and/or other input and output components that facilitate the transmission of data to other devices.

As described herein, device 200 may perform certain operations relating to condition detection. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
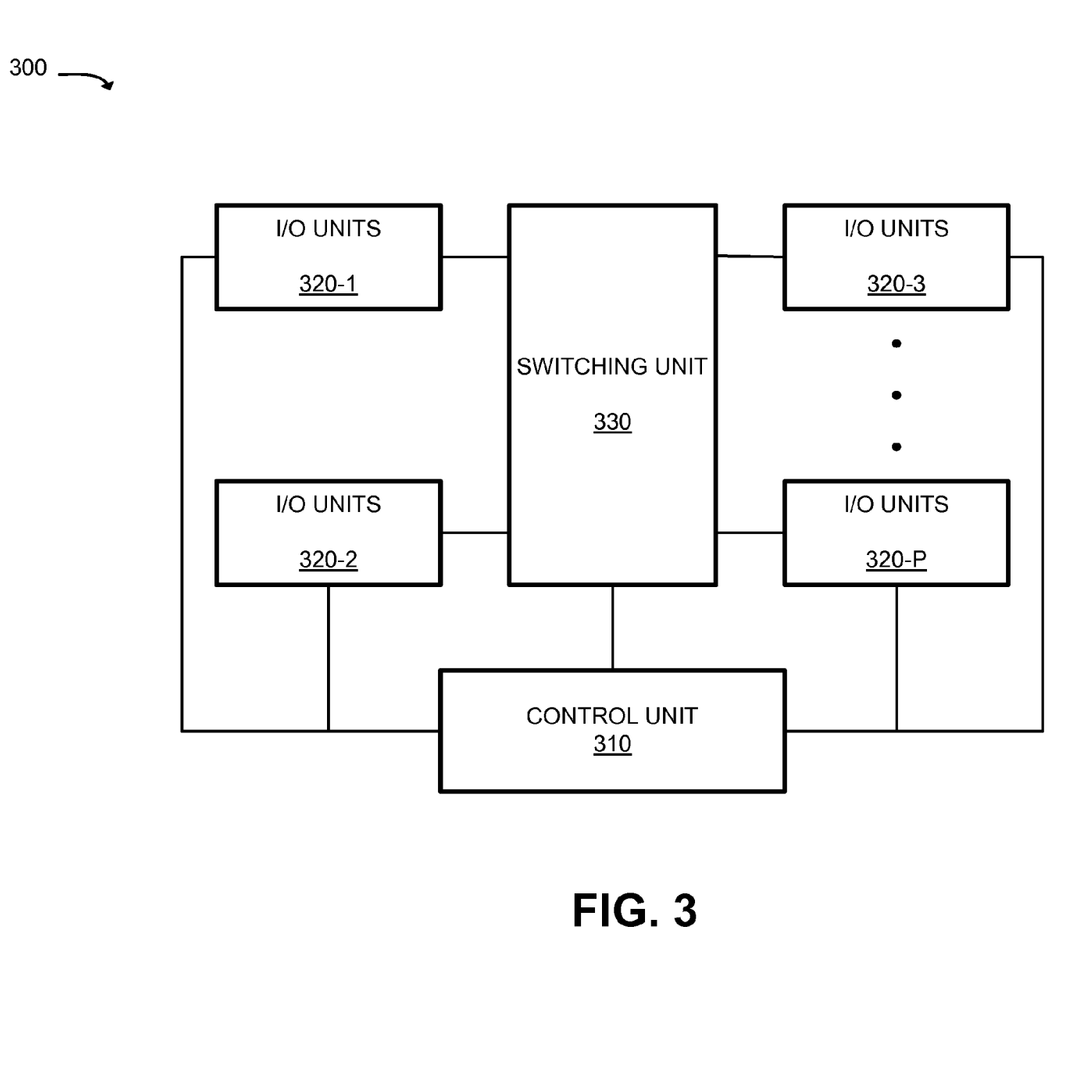
FIG. 3 is a diagram of example components of one or more devices of FIG. 1.

FIG. 3 is a diagram of example components of device 300 that may correspond to one or more of SGW 130, and/or PGW 170. Alternatively, or additionally, eNB 120, SGW 130, and/or PGW 170 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for device 300. For example, control unit 310 may maintain the connectivity and manage information/data necessary for transferring packets by device 300. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for device 300. Control unit 310 may also perform other general control and monitoring functions for device 300.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 100). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations associated with call processing and/or data transfer. Device 300 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

Figure 4:
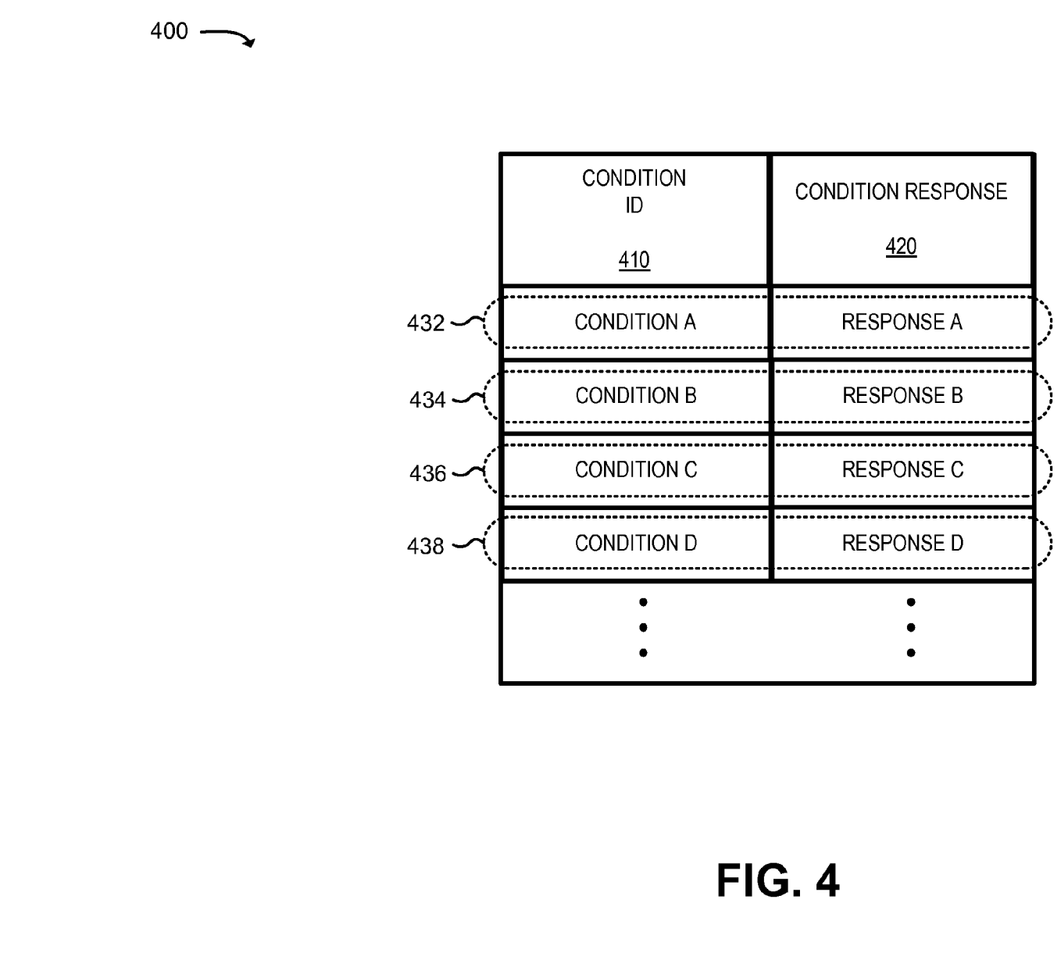
FIG. 4 is a diagram of an example condition and response data structure according to an implementation described herein.

FIG. 4 is a diagram of an example condition and response data structure 400 (hereinafter referred to as "CR data structure 400") according to an implementation described herein. In one example implementation, one or more CR data structures 400 may be stored in a storage device that is included as part of a memory associated with CSCF server 160 and/or analytics server 165. In another implementation, one or more CR data structures 400 may be stored in a memory, associated with another device or a group of devices, separate from or including the memory associated with CSCF server 160 and/or analytics server 165.

CR data structure 400 may include a collection of fields, such as a condition identifier (ID) field 410 and a condition response field 420. Although FIG. 4 shows example fields 410-420 of data structure 400, in other implementations, data structure 400 may include fewer fields, different fields, additional fields, or differently arranged fields than depicted in FIG. 4. Additionally, or alternatively, one or more fields of data structure 400 may include information described as being included in one or more other fields of data structure 400.

Condition ID field 410 may store information associated with a type of condition that may be detected, by CSCF server 160 and/or analytics server 165, when handling calls and/or traffic associated with user device 110. In another example implementation condition ID field 410 may store information associated with a level of severity (e.g., a low, moderate, maximum, or some other level of severity) associated with the type of condition. Condition response field 420 may store information associated with one or more responses and/or actions, to be performed by CSCF server 160 and/or analytics server 165 to mitigate and/or remedy the condition in a manner that corresponds to the type of condition and/or the level of severity of the condition identified in condition ID field 410.

For example, CSCF server 160 may communicate with user device 110 to initiate a call session and may detect a condition relating to the traffic being received from user device 110. CSCF 160 may send a notification to analytics server 165 that indicates that the condition has been detected. Analytics server 165 may receive the notification and may monitor and/or analyze packets associated with the traffic. Analytics server 165 may identify, based on the traffic, a type of condition and/or a level of severity of the condition (e.g., condition A) associated with the traffic (e.g., as shown by ellipse 432). Based on the identification of the type of condition and/or the level of severity of the condition, analytical server 165 may perform a look-up operation using CR data structure 400. Analytics server 165 may, for example, access CR data structure 400 and may identify information associated with a response (e.g., response A) that identifies an operation to be performed to mitigate and/or remedy the condition (e.g., as shown by ellipse 432).

Analytics server 165 may identify other types of conditions and/or other levels of severity of the conditions relating to the traffic and/or other traffic (e.g., condition B-condition D) and may perform a look-up operation for each of the other types of conditions (e.g., as shown by ellipses 434-438). Based on the look-up operation for each of the other types of conditions, analytics server 165 may identify other information associated with a respective response (e.g., response B-response D) that identifies a operation to be performed to mitigate and/or remedy the other types of conditions and/or the other levels of severity (e.g., as shown by ellipses 434-438).

An identified condition (e.g., condition A) may be related to detection, within the traffic, of a message that is based on an incorrect protocol. In another example, the identified condition may be detected, within the traffic, based on a data rate, a quantity of bandwidth, a quantity of mis-ordered packets, a quantity of unexpected message types, a quantity of out-of-order signals, etc., that is greater than a respective threshold associated with condition A.

Analytics server 165 may, based on a look-up operation, identify a response (e.g., corresponding to response A), associated with a notification operation, to mitigate and/or remedy the condition. The notification operation may include, for example, ignoring the condition and/or sending a notification to user device 110 indicating that a condition is present (e.g., which may affect call quality, etc.).

An identified condition (e.g., condition B) may be related to detection, within the traffic, of a quantity of messages (e.g., greater than a condition B threshold) that are based on an incorrect protocol. In another example, the identified condition may be detected, within the traffic, based on another data rate, another quantity of bandwidth, another quantity of mis-ordered packets, another quantity of unexpected message types, another quantity of out-of-order signals, etc., that is greater than another respective threshold associated with condition B.

Analytics server 165 may, based on a look-up operation, identify a response (e.g., corresponding to response B), associated with a repair operation, to mitigate and/or remedy the condition. The repair operation may include, for example, sending a notification to PCRF server 155 that indicates that the repair operation is to be performed. PCRF 155 may receive the notification and may send an instruction to eNB 120, SGW 130, CSCF server 160, and/or PGW 170, etc. indicating that the bandwidth and/or data rate associated with the traffic is to be reduced to a level that is less than a particular condition B threshold. In another example, the repair operation may include sending updated software to user device 110 that may cause user device 110 to communicate in a manner that conforms to protocols used by CSCF server 160 and/or remedies the condition.

An identified condition (e.g., condition C) may be related to detection, within the traffic, of another quantity of messages (e.g., greater than a condition C threshold) that are based on an incorrect protocol. In another example, the identified condition may be detected, within the traffic, based on a further data rate, a further quantity of bandwidth, a further quantity of mis-ordered packets, a further quantity of unexpected message types, a further quantity of out-of-order signals, etc., that is greater than a further respective threshold associated with condition C.

Analytics server 165 may, based on a look-up operation, identify a response (e.g., corresponding to response C), associated with a containment operation, to mitigate and/or remedy the condition. The containment operation may include, for example, sending a notification to PCRF server 155 that indicates that the containment operation is to be performed. PCRF 155 may receive the notification and may send an instruction to eNB 120, SGW 130, CSCF server 160, and/or PGW 170, etc. indicating that the bandwidth and/or data rate associated with the traffic is to be reduced to a level that is less than a particular condition C threshold. In another example, the containment operation may include downgrading a forwarding priority and/or QoS associated with traffic received from user device 110. In yet another example, the containment operation may include restricting services to be provided to and/or accessed by user device 110.

An identified condition (e.g., condition D) may relate to detection of nefarious information (e.g., malicious software, such as viruses, worms, spy ware, etc.) and/or an electronic attack (e.g., spoofing, denial of service attacks, etc.) associated with the traffic. Analytics server 165 may, based on a look-up operation, perform an action and/or response (e.g., associated with response D), associated with a termination operation, to mitigate and/or remedy the condition. The termination operation may include, for example, sending a notification to PCRF server 155 that indicates that a call and/or call session, associated with user device 110, is to be terminated. PCRF server 155 may receive the notification and may send an instruction to bearers associated with the call and/or call session (e.g., eNB 120, SGW 130, PGW 170, etc.), indicating that the call and/or call session is to be terminated. PCRF server 155 may, in another example, send an instruction, to HSS 150 and/or MME 130, indicating that access to the network is not to be authorized and/or that a level of authorization and/or access to the network are to be reduced. The notification may include an instruction to flush and/or purge information, associated with the traffic, from memories that store information associated with the traffic.

Figure 5:
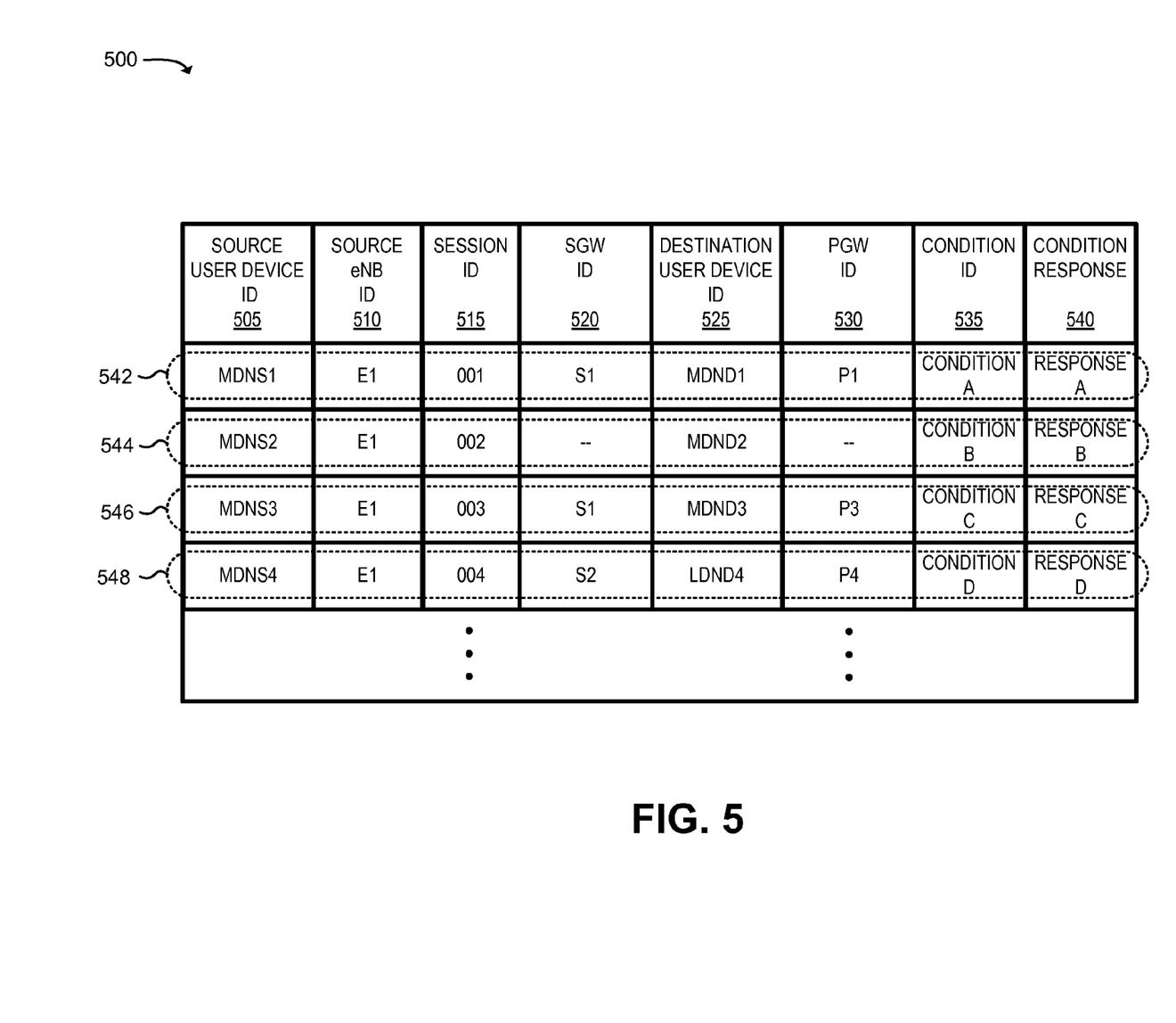
FIG. 5 is a diagram of an example condition log data structure according to an implementation described herein.

FIG. 5 is a diagram of an example condition log data structure 500 according to an implementation described herein. Condition log data structure 500 may include a collection of fields, such as a source user device identifier field 505 (hereinafter referred to as "source UD field 505"), a source eNB identifier (ID) field 510, an session identifier (ID) field 515, a serving gateway (SGW) identifier (ID) field 520, a destination user device (UD) identifier field 525 (hereinafter referred to as "destination UD field 525"), a packet data network gateway (PGW) identifier (ID) field 530, a condition identifier (ID) field 535 and a condition response field 540. Although FIG. 5 shows example fields of data structure 500, in other implementations, data structure 500 may include fewer fields, different fields, additional fields, or differently arranged fields than depicted in FIG. 5. Additionally, or alternatively, one or more fields of data structure 500 may include information described as being included in one or more other fields of data structure 500.

Source UD field 505 may store information associated with a source user device 110 from which a call was made. For example, CSCF server 160 and/or analytics server 165 may store, in source UD field 505, a device identifier (e.g., MDN, IMSI, IMISDN, etc.) and/or an address (e.g., a MAC address, etc.) associated with source user device 110. Source eNB ID field 510 may store information associated with eNB 120 via which source user device 110 is communicating. For example, CSCF server 160 and/or analytics server 165 may store, in source eNB ID field 510, a device identifier (e.g., an electronic serial number and/or some other device identifier), a device address (e.g., an IP address, etc.), a cell identifier, etc. associated with source eNB 120. Session ID field 515 may store information corresponding to a call session associated with source user device 110. For example, CSCF server 160 and/or analytics server 165 may store a unique identifier that corresponds to a call session that has been initiated, or established, with source user device 110. SGW ID field 520 may store information associated with SGW 130 via which source user device 110 is communicating to initiate, or establish, the call session. Destination UD field 525 may store information, associated with a destination user device 110, obtained from the traffic received from source user device 110. PGW ID field 530 may store information associated with PGW 170 via which source user device 110 is to communicate with destination user device 110 after the call session has been established. Condition ID field 535 may store information associated with a type of condition that may be detected, by CSCF server 160 and/or analytics server 165, when handling calls and/or traffic associated with user device 110. Condition response field 540 may store information associated with one or more responses and/or actions, to be performed by CSCF server 160 and/or analytics server 165, to mitigate and/or remedy the particular condition identified in condition ID field 535.

CSCF server 160 may receive traffic, from source user device 110, requesting to establish a call session. CSCF server 160 may, in response to the request, communicate with source user device 110 (e.g., using a SIP protocol and/or some other protocol) to establish the call session. CSCF server 160 may detect a condition associated with traffic received from source user device 110 and may store information, obtained from the traffic, in a condition log (e.g., condition log data structure 500). For example, CSCF server 160 may store, in the condition log, information associated with user device 110 (e.g., MDNS1) and/or information associated with eNB 120 (e.g., E1) and/or SGW 130 (e.g., S1) via which source user device 110 is communicating (e.g., as shown by ellipse 542).

CSCF server 160 may assign a unique session identifier (e.g., 001) to the call session and may store the unique session identifier in the condition log(e.g., as shown by ellipse 542). CSCF server 160 may store information associated with destination user device 110 (e.g. MDND1) to which source user device 110 intends to place a call and/or information associated with PGW 170 via which the call is to be routed (e.g., P1) (e.g., as shown by ellipse 542). CSCF server 160 may identify a type of condition (e.g., condition A) and/or a manner in which the condition is to be mitigated and/or remedied (e.g., response A) and may store the information associated with the type of condition and/or the manner in which the condition is to be mitigated and/or remedied in the condition log (e.g., as shown by ellipse 542).

CSCF server 160 may, in a manner similar to that described above, detect other conditions associated with the traffic and/or may detect other conditions associated with other traffic received from other sources user devices 110. CSCF server 160 may send a notification to analytics server 165 indicating that the other conditions have been detected. Analytics server 165 may receive the notification and may monitor and/or analyze packets associated with the traffic to identify a respective condition type and/or level of severity associated with the other conditions. Analytics server 165 may, in a manner similar to that described above (e.g., with respect to FIG. 4), perform a look up operation to identify a manner in which to respond to the conditions. Analytics server 165 may, as a result of detecting the other conditions, store information, obtained from the traffic and/or the other traffic, in the condition log(e.g., as shown by ellipses 544-548).

Figure 6:
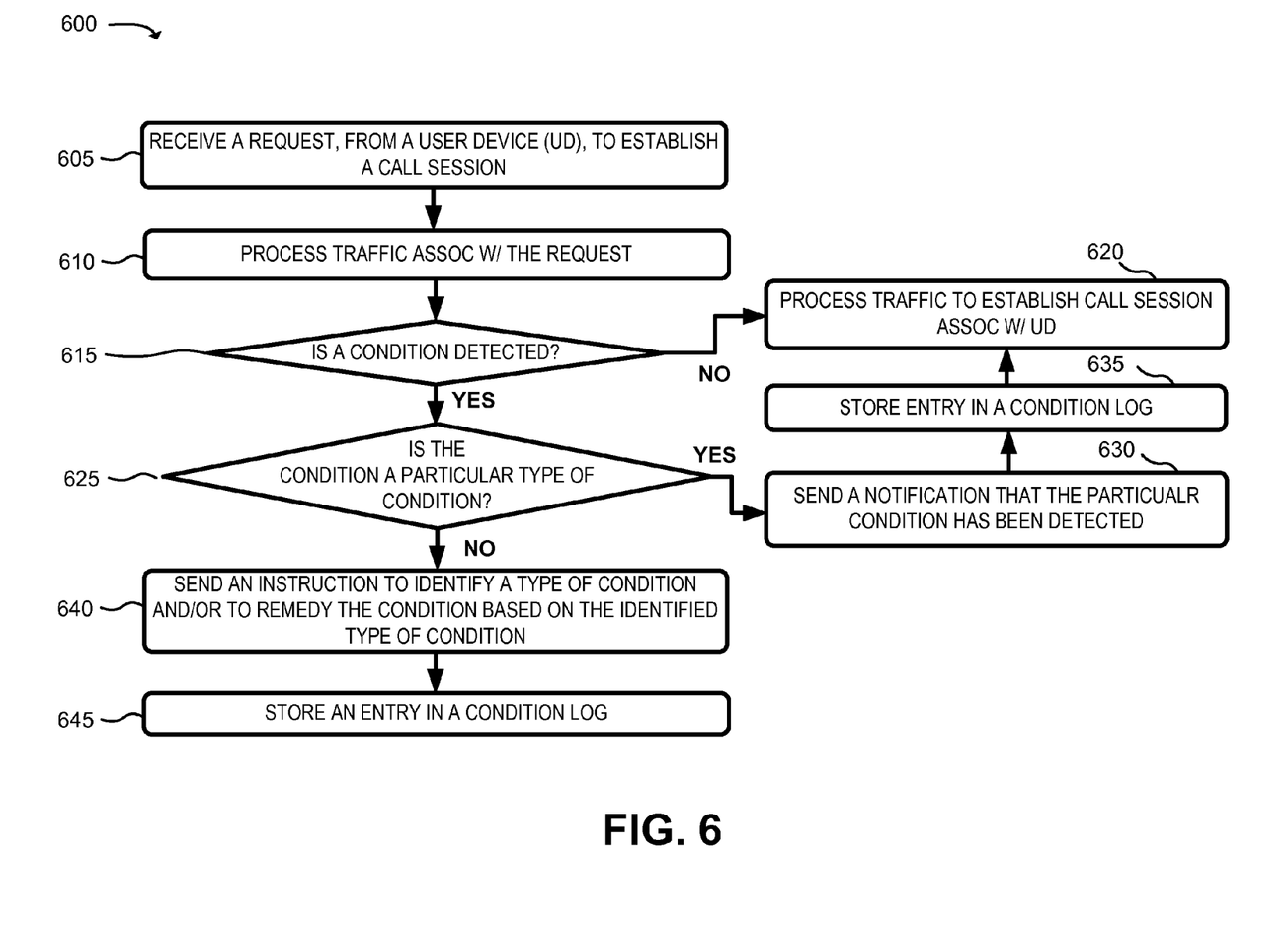
FIG. 6 is a flow chart of an example condition detection and response process according to an implementation described herein.

FIG. 6 is a flow chart of an example condition detection and response process 600 according to an implementation described herein. In one example implementation, process 600 may be performed by CSCF server 160 and/or analytics server 165. In another example implementation, some or all of process 600 may be performed by a device or collection of devices separate from, or in combination with CSCF server 160 and/or analytics server 165.

As shown in FIG. 6, process 600 may include receiving a request, from user device 110, to establish a call session (block 605) and processing the traffic associated with the request. For example, user device 110 may send a request (e.g., based on a SIP) to establish a call session with an EPS. CSCF server 160 may receive the request and may process traffic associated with the request. For example, CSCF server 160 may, based on processing the traffic, determine whether a condition is associated with the traffic.

CSCF server 160 may, for example, determine that a condition is associated with the traffic when protocol and/or signaling errors, such as an unexpected message type, a mis-ordered packet, out-of-order signaling, an incorrect protocol, an unexpected message type etc., is detected within the traffic. In another example, CSCF server 160 may detect a condition when a bandwidth and/or data rate, associated with the traffic, is greater than a threshold. In yet another example, CSCF server 160 may identify a condition when nefarious information and/or malicious software (e.g., a virus, a worm, spy ware, etc.), and/or an electronic attack (e.g., spoofing, a denial of service attack, etc.) are identified within the traffic.

As also shown in FIG. 6, if a condition is not detected (block 615—NO), then process 600 may include processing the traffic to establish a call session with user device 110 (block 620). For example, CSCF server 160 may determine that no condition has been detected in relation to the traffic based on processing the traffic associated with the request. CSCF server 160 may, for example, not detect a protocol and/or signaling error within the traffic. In another example, CSCF server 160 may not detect a bandwidth and/or data rate, associated with the traffic, that is greater than the threshold. In yet another example, CSCF server 160 may not detect nefarious information and/or malicious software (e.g., a virus, a worm, spy ware, etc.), and/or an electronic attack (e.g., spoofing, a denial of service attack, etc.) within the traffic.

Based on the determination that a condition, associated with the traffic, has not been detected, CSCF server 160 may establish the call session with user device 110 via which a call, placed by user device 110, may be routed to a destination user device 110.

As further shown in FIG. 6, if a condition is detected (block 615—YES) and the condition is a particular type of condition (block 625—YES), then process 600 may include sending a notification that the particular condition has been detected (block 630). For example, CSCF server 160 may identify a condition associated with the traffic, as a result of processing the traffic. For example, CSCF server 160 may detect a condition based on a determination that a quantity of bandwidth and/or a data rate, associated with the traffic, is greater than a threshold. In another example, CSCF server 160 may detect a condition based on a determination that a quantity of mis-ordered packets, a quantity of unexpected message types, a quantity of out-of-order signals, etc., is greater than a respective threshold. In yet another example, CSCF server 160 may detect a condition based on a determination that nefarious information and/or malicious software (e.g., a virus, a worm, spy ware, etc.), and/or an electronic attack (e.g., spoofing, a denial of service attack, etc.) exists within the traffic. CSCF server 160 may, in this example, terminate communications with user device 110 as a security precaution to prevent damage to CSCF server 160.

Based on the determination that the condition is associated with the traffic, CSCF server 160 may determine that the condition is a particular type of condition (e.g., a minor condition associated with a low level of severity). Generally, the particular type of condition may be, for example, a minor condition that is associated with a low level of severity (e.g., relative to a threshold). For example, CSCF server 160 may identify the condition as a minor condition when a quantity of bandwidth and/or a data rate, associated with the traffic, is less than a threshold associated with a moderate condition, where the threshold associated with the moderate condition that is greater than the threshold associated with the minor condition. In another example, CSCF server 160 may detect the minor condition based on a determination that a quantity of mis-ordered packets, a quantity of unexpected message types, a quantity of out-of-order signals, etc., is less than a respective threshold associated with the moderate condition.

Based on the determination that the condition is a minor condition, CSCF server 160 may send a notification indicating that the minor condition has been detected. In one example, the notification may be sent to user device 110 instructing user device 110 to perform an operation (e.g., to download updated software to remedy the minor condition, etc.). In another example, the notification may be sent to HSS 150 indicating an operation is to be performed on user device 110 to remedy the condition (e.g., by sending updated software to user device 110 and/or performing another operation). In yet another example, the notification may be sent to analytics server 165 indicating that packets, associated with the traffic, are to be analyzed to identify whether other conditions are associated with the traffic.

In another example implementation, CSCF server 160 may perform a look up operation to identify a manner in which to respond to the condition. For example, CSCF server 160 may, in a manner similar to that described above (e.g., with respect to FIG. 4), perform a look up operation using a CR data structure (e.g., CR data structure 400 of FIG. 4) to identify a manner in which to respond to the condition. CSCF server 160 may identify a condition that corresponds to the minor condition (e.g., condition A of FIG. 4) and may obtain, from the CR data structure, information associated with a manner in which to respond to the condition (e.g., associated with response A of FIG. 4).

As yet further shown in FIG. 6, process 600 may include storing an entry, associated with the condition, in a condition log (block 635) and processing the traffic to establish the call session (block 620). For example, CSCF server 160 may, in a manner similar to that described above (e.g., condition log data structure 500 of FIG. 5), store information associated with the condition in data structure associated with a condition log (e.g., stored in a memory associated with CSCF server 160 and/or analytics server 165. Additionally, or alternatively, CSCF server 160 may establish the call session with user device 110 based on the determination that the condition is a minor condition. CSCF server 160 may receive a call associated with the call session, from user device 110, and may process the call as a normal call and/or may process the call in a manner that ignores the condition.

Based on the determination that the condition is a minor condition, CSCF server 160 may perform an operation in response to the minor condition. In one example implementation, the operation to be performed in response (e.g., response A of FIG. 4) to the minor condition (e.g., condition A of FIG. 4) may be associated with a notification operation. In one example, CSCF server 160 may send a notification instructing user device 110 to perform an operation (e.g., to download updated software to remedy the minor condition, etc.). In another example, the notification may be sent to HSS 150 indicating an operation is to be performed on user device 110 to remedy the condition (e.g., by sending updated software to user device 110 and/or performing another operation). In yet another example, the notification may be sent to analytics server 165 indicating that packets, associated with the traffic, are to be analyzed to identify whether other conditions are associated with the traffic.

As further shown in FIG. 6, if a condition is detected (block 615—YES) and the condition is not the particular type of condition (block 625—NO), then process 600 may include sending an instruction to identify the type of condition and/or to remedy the condition based on the identified type of condition (block 640). CSCF server 160 may determine that the condition is not a minor condition when a quantity of bandwidth and/or a data rate, associated with the traffic, is not less than a threshold associated with a moderate condition (e.g., a threshold associated with condition B of FIG. 4). In another example, CSCF server 160 may determine that the condition is not a minor condition based on a determination that a quantity of mis-ordered packets, a quantity of unexpected message types, a quantity of out-of-order signals, etc., is not less than a respective threshold associated with the moderate condition (e.g., a respective threshold associated with condition B of FIG. 4). In yet another example, CSCF server 160 may determine that the condition is not a minor condition when CSCF server 165 detects nefarious information within the traffic and/or a potential electronic attack associated with the traffic.

Based on the determination that the condition is not a minor condition, CSCF server 160 may send a notification to analytics server 160 that indicates that the condition is not the minor condition. The notification may instruct analytics server 165 to inspect packets associated with the traffic to identify a type of condition (e.g., condition B, C, D, etc. of FIG. 4) and/or a level of severity associated with the condition. Sending the notification to analytics server 165 may permit CSCF server 160 to process other traffic associated with other user devices 110. Additionally, the notification may enable analytics server 165 to remedy and/or mitigate the condition so that CSCF server 160, and/or other devices within the IMS core and/or EPC, are not affected and/or damaged by the condition.

Analytics server 160 may receive the notification and may perform, in response to the notification, an operation to identify a type of condition and/or a level of severity associated with the condition. For example, analytics server 165 may identify the condition as a moderate condition when a quantity of bandwidth and/or a data rate, associated with the traffic, is not less than a threshold associated with the moderate condition (e.g., associated with condition B or C of FIG. 4) and is less than a threshold associated with a major condition (e.g., associated with condition D of FIG. 4). Analytics server 165 may, in another example, detect the moderate condition based on a determination that a quantity of mis-ordered packets, a quantity of unexpected message types, a quantity of out-of-order signals, etc., is not less than a respective threshold associated with the moderate condition and is less than another threshold associated with a major condition.

In another example, analytics server 165 identify the condition as a major condition when a quantity of bandwidth and/or a data rate, associated with the traffic, is greater than a threshold associated with the major condition (e.g., a threshold associated with condition D of FIG. 4). The threshold associated with the major condition may, for example, be greater than the threshold associated with the moderate condition. Analytics server 165 may, in another example, detect the major condition based on a determination that a quantity of mis-ordered packets, a quantity of unexpected message types, a quantity of out-of-order signals, etc., is greater than a respective threshold associated with the major condition. In yet another example, analytics server 165 may detect the major condition when nefarious information and/or an electronic attack, associated with the traffic, is detected.

Analytics server 165 may perform an operation to identify a manner in which to respond to the condition based on the type of condition that was identified as a result of analyzing the packets. For example, analytics server 160 may, in a manner similar to that described above (e.g., with respect to FIG. 4), perform a look up operation, using a CR data structure (e.g., CR data structure 400 of FIG. 4), to identify a whether to perform a repair operation, a containment operation, or a termination operation.

Analytics server 160 may, for example, identify a condition that corresponds to the moderate condition (e.g., condition B or C of FIG. 4) and may obtain, from the CR data structure, information associated with a manner in which to respond to the moderate condition (e.g., associated with response B or C, of FIG. 4, respectively).

In one example, a response to a moderate condition (e.g., condition B) may be a repair operation. Analytics server 160 may perform the repair operation by sending a notification to PCRF server 155 indicating that the bandwidth and/or data rate, associated with the traffic, is to be reduced below a condition B threshold, a condition A threshold, and/or some other threshold. PCRF server 155 may receive the notification may instruct signal bearers associated with the traffic (e.g., eNB 120, SGW 130, PGW 170, etc.) to reduced the bandwidth and/or data rate, associated with the traffic, is to a level that is below the condition B threshold, the condition A threshold, and/or some other threshold. In another example, the repair operation may include sending updated software to user device 110 that may cause user device 110 to send traffic in a manner that is not associated with the moderate condition.

In another example, a response to a moderate condition (e.g., condition C) may be a containment operation. Analytics server 160 may perform the containment operation by sending a notification to PCRF server 155 that indicates that a bandwidth and/or data rate associated with the traffic is to be reduced below a condition C threshold, a condition B threshold, and/or some other threshold. PCRF server 155 may receive the notification and may instruct signal bearers associated with the traffic (e.g., eNB 120, SGW 130, PGW 170, etc.) to reduce the bandwidth and/or data rate, associated with the traffic, to a level that is below the condition C threshold, a condition B threshold, and/or some other threshold. In another example, analytics server 165 may send a notification, to PCRF server 155, to downgrade a forwarding priority and/or QoS associated with traffic. PCRF server 155 may, in response to the notification, downgrade the forwarding priority and/or reduce the QoS associated with the traffic. In yet another example, analytics server 165 may send a notification to MME device 140 and/or HSS 150 indicating a level of access to the EPS and/or to services is to be reduced.

In yet another example, a response to a major condition (e.g., condition D of FIG. 4) may be a termination operation. Analytics server 165 may perform the termination operation by sending a notification to PCRF server 155 that indicates that communication and/or a call session, associated with user device 110, is to be terminated. PCRF server 155 may receive the notification and may send an instruction to the bearers, associated with the traffic and/or call session (e.g., eNB 120, SGW 130, MME 140, HSS 150, PGW 170, etc.) indicating that communications with user device 110 are to be terminated and/or that access to network services are not to be authorized. The termination operation may include flushing and/or purging information, associated with the traffic, from memories associated with the signal bearers and/or other devices associated with traffic handling and/or the call session (e.g., MME device 140, HSS 150, CSCF server 160, etc.). Additionally, or alternatively, analytics server 165 may send the notification to CSCF server 160 which may preclude establishing the call session and/or may cause the call session to be terminated.

In another example implementation, CSCF server 160 may identify a type of condition associated with the traffic and/or may perform a look up operation to identify a manner in which to respond to the condition based on the type of condition.

As also shown in FIG. 6, process 600 may include storing an entry in a condition log (block 645). For example, CSCF server 160 may store an entry in a condition log data structure that indicates that a condition, other than a particular type of condition was detected. The entry may include information associated with the condition, such as information associated with a source user device 110, a destination user device 110, information associated with signal bearers associated with the traffic (e.g., eNB 120, SGW 130, PGW 170, etc.). Additionally, or alternatively, analytics server 165 may store another entry and/or update the entry based on the operation to repair, contain, or terminate communicates and/or the call session associated with user device 110. The entry and/or updated entry may include other information associated with the condition, such as information associated with a type of condition, information associated with a type of response to the condition (e.g., a repair, containment, and/or termination operation), information associated with a time at which the condition was detected, and/or another time at which the condition was remedied.

Systems and/or methods, described herein, may enable a condition, associated with a call, to be detected. The systems and/or methods may enable the call to be transferred to another device to be processed offline so that the systems and/or methods may continue to process other calls. When processing the calls offline, the systems and/or methods may enable a repair, containment, and/or termination operation to be performed on the call that avoids, mitigates, and/or remedies the condition.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "packet" as used herein, may refer to a datagram, a data item, or a cell; a fragment of a packet, a fragment of a datagram, a fragment of a data item, a fragment of a cell; or another type, arrangement, or packaging of data.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a server device in an Internet protocol (IP) multimedia subsystem (IMS) core, that initiates call sessions or routes calls associated with user devices, the method comprising:

receiving, by the server device and from a user device, traffic associated with a request to initiate a call session;

detecting, by the server device, a condition associated with the traffic;

determining, by the server device, whether to establish the call session based on whether the condition, associated with the traffic, is a minor type of condition;

sending, by the server device and to a second server device, a notification to perform an operation to mitigate or remedy the condition when the condition does not correspond to the minor type of condition, where sending the notification enables the second server device to:

identify whether a type of condition that is associated with the condition is a moderate type of condition or a major type of condition, wherein the moderate type of condition is associated with a level of severity that is greater than a first threshold and less than a second threshold, and wherein the major type of condition is associated with a level of severity that is greater than the second threshold; and initiate an operation to mitigate or remedy the condition, based on identifying the type of condition as the moderate type of condition, that permits the server device to establish the call session in a manner that does not degrade performance of the server device;

establishing, by the server device, the call session when the type of condition corresponds to the minor type of condition or when the type of condition corresponds to the moderate type of condition that has been mitigated or remedied, where establishing the call session enables a call, placed by the user device, to be processed as a normal call; and terminating, by the server device, the call session when the type of condition corresponds to the major type of condition.

2. The method of claim 1, where detecting the condition associated with the traffic includes at least one of:

determining that a quantity of bandwidth or a data rate, associated with the traffic, is greater than a third threshold;

determining that a quantity of unexpected message types, associated with the traffic, is greater than a fourth threshold;

determining that a quantity of mis-ordered packets, associated with the traffic, is greater than a fifth threshold; or detecting, within the traffic, nefarious information or an indication that an electronic attack is being performed.

3. The method of claim 2, where determining whether to establish the call session includes:

determining that the type of condition corresponds to the minor type of condition when the quantity of bandwidth or the data rate is less than a threshold associated with the minor type of condition, where the threshold associated with the minor type of condition is the third threshold.

4. The method of claim 1, where establishing the call session when the detected type of condition corresponds to the minor type of condition includes:

sending another notification to the user device, where the other notification instructs the user device to download software that remedies the condition.

5. The method of claim 1, where establishing the call session when the type of condition corresponds to the minor type of condition includes:

storing information associated with the condition in a data structure, where the information associated with the minor condition includes at least one of:
a time when the condition was detected,
information associated with the user device or another user device that is affected by the condition,
an indication that the condition is the minor type of condition, or
information associated with one or more devices, within the service provider network, via which the call is routed to a destination user device.

6. The method of claim 1, where determining whether to establish the call session includes:

determining that the type of condition does not correspond to the minor type of condition when a quantity of bandwidth or a data rate, associated with the traffic, is greater than a threshold associated with the minor type of condition.

7. The method of claim 1, further comprising:

receiving, from the second server device, an indication that a termination operation is to be performed; and performing, in response to the indication that the termination operation is to be performed, the termination operation that precludes the establishment of the call session.

8. The method of claim 7, where performing the termination operation includes:

terminating a communication with the user device that precludes receiving traffic from the user device; and purging, from a memory associated with the server device, information associated with the traffic that was received from the user device.

9. A device, in an Internet protocol (IP) multimedia subsystem (IMS) core, that initiates call sessions or routes calls associated with user devices, the device comprising:

a processor to:
receive, from a user device, a request to establish a call session,
determine whether a condition is associated with traffic that corresponds to the request,
establish the call session when the condition is not associated with the traffic, where establishing the call session enables one or more calls, associated with the user device, to be processed by the device,
determine whether the condition is a minor condition when the condition is associated with the traffic, where the minor condition is associated with a level of severity that is less than a first threshold,
establish the call session when the condition is the minor condition, where establishing the call session enables the one or more calls to be processed in a manner that does not reduce the performance of the device,
transmit, to a server device, an instruction that enables the condition to be remedied or mitigated when the condition is not the minor condition,
receive, from the server device and based on transmitting the instruction, a notification that the condition is a moderate condition or a major condition, wherein the moderate condition is associated with a level of severity that is greater than the first threshold and less than a second threshold, and wherein the major condition is associated with a level of severity that is greater than the second threshold,
establish the call session when the condition is the moderate condition and the notification indicates that the moderate condition was remedied or mitigated, and
terminate the call session when the condition is the major condition.

10. The device of claim 9, where, when determining whether the condition is associated with the traffic, the processor is to:

determine that the condition is associated with the traffic when a quantity of bandwidth, associated with the traffic, is greater than a third threshold, determine that the condition is associated with the traffic when a quantity of mis-ordered packets, associated with the traffic, is greater than a fourth threshold, determine that the condition is associated with the traffic when a quantity of mis-ordered signals, associated with the traffic, is greater than a fifth threshold, determine that the condition is associated with the traffic when a quantity of unexpected message types, associated with the traffic, is greater than a sixth threshold, and determine that the condition is associated with the traffic when nefarious information is associated with the traffic or an electronic attack is detected from the traffic.

11. The device of claim 10, where, when determining whether the condition is the minor condition, the processor is to:
   determine that the condition is the minor condition when the quantity of bandwidth is less than a seventh threshold, the seventh threshold being greater than the third threshold,
   determine that the condition is the minor condition when the quantity of mis-ordered packets is less than an eighth threshold, the eighth threshold being greater than the fourth threshold,
   determine that the condition is the minor condition when the quantity of mis-ordered signals is less than a ninth threshold, the ninth threshold being greater than the fifth threshold, and
   determine that the condition is the minor condition when the quantity of unexpected message types is less than a tenth threshold, the tenth threshold being greater than the sixth threshold.

12. The device of claim 10, where, when determining whether the condition is the minor condition, the processor is to:
   determine that the condition is not the minor condition when the nefarious information is associated with the traffic or the electronic attack is detected from the traffic.

13. The device of claim 9, where, when determining whether a condition is associated with the traffic, the processor is to:
   detect nefarious information or an electronic attack associated with the traffic, and
   deny the request to establish the call session based on the detection of the nefarious information or the electronic attack, where, when denying the request, the processor is to terminate communication with the user device.

14. The device of claim 9, where
   the major condition is associated with a level of severity associated with damage to the device.

15. The device of claim 9,
   where the minor condition corresponds to a level of severity that does not reduce the performance of the device,
   where the moderate condition corresponds to a second level of severity that reduces the performance of the device, and
   where the major condition corresponds to a third level of severity that reduces the performance of the device or causes damage to the device.

16. The device of claim 9, where the processor is further to:
   defer establishing the call session when the notification indicates that the moderate condition was not remedied or mitigated.

17. The device of claim 9, where, when transmitting the instruction that enables the condition to be remedied or mitigated, the processor is further to:
   process other traffic associated with another user device, where processing the other traffic is performed in a manner that is not affected by the condition.

18. A system comprising:
   a call session control function (CSCF) device to:
      receive, from a user device, a call associated with a call session,
      determine, in response to the call, whether a condition is associated with the call,
      process the call, as a normal call, when a condition is determined not to be associated with the call, where processing the call, as the normal call, permits the call to be sent to a destination user device,
      identify a type of condition when a condition is determined to be associated with the call,
      process the call, as the normal call, when the type of condition is identified as a minor condition, where the minor condition does not reduce a performance of the CSCF device to a first level that is less than a first threshold,
      send a notification indicating that an operation to remedy the condition is to be performed when the type of condition is not identified as the minor condition; and
   an analytics device to:
      receive the notification from the CSCF device,
      determine, in response to the notification, whether the type of condition is a moderate condition or a major condition,
         where the moderate condition causes the CSCF device to perform at a second level that is less than the first threshold, and
         where the major condition causes the CSCF device to perform at a third level that is less than a second threshold, the second threshold being less than the first threshold,
      initiate the operation to remedy the condition when the condition is determined to be the moderate condition, and
      send, to the CSCF device, an instruction to terminate the call session when the condition is determined to be the major condition.

19. The system of claim 18, where, when processing the call when the type of condition is identified as the minor condition, the CSCF device is further to:
   send, to the user device, another instruction to download software that remedies the minor condition.

20. The system of claim 18, where, when determining whether the type of condition is the moderate condition or the major condition, the analytics device is to:
   identify the type of condition as the moderate condition when:
      a quantity of bandwidth, associated with the call, is greater than a first particular threshold associated with the moderate condition and is less than a second particular threshold associated with the major condition, or
      a quantity of mis-ordered packets, associated with the call, is greater than a third particular threshold associated with the moderate condition and is less than a fourth particular threshold associated with the major condition.

21. The system of claim 18, where, when determining whether the type of condition is the moderate condition or the major condition, the analytics device is to:
   identify the type of condition as the moderate condition when:
      a quantity of unexpected message types, associated with the call, is less than a first particular threshold associated with the moderate condition and is less than a second particular threshold associated with the major condition, or
      a quantity of out-of-order signals, associated with the call, is greater than a third particular threshold associated with the moderate condition and is less than a fourth particular threshold associated with the major condition.

22. The system of claim 18, where, when determining whether the type of condition is the moderate condition or the major condition, the analytics device is further to:
   analyze packets associated with the call to obtain information associated with the condition, and identify the type of condition as the major condition when nefarious information or information associated with an electronic attack is detected within the information associated with the condition.

23. The system of claim 18, where, when initiating the operation to remedy the condition, the analytics device is to:
send a notification that causes signal bearers, associated with the call session, to reduce a bandwidth or a data rate, associated with the call, to a level that is less than a particular threshold.

24. The system of claim 18, where, when initiating the operation to remedy the condition, the analytics device is to:
send a notification that causes a policy and charging resource function (PCRF) server to reduce a quality of service (QoS) or a forwarding priority, associated with the call session, to a level that is less than a particular threshold.

25. The system of claim 18, where, after initiating the operation to remedy the condition, the analytics device is further to:
send, to the CSCF device, another instruction to process the call as the normal call.

\* \* \* \* \*